INDUCTIVE NOISE CANCELLING DEVICE FOR MAGNETIC MEMORY ARRAY

Filed June 8, 1964

2 Sheets-Sheet 1

INVENTORS.
CHARLES B. HAENTZE
EDGAR O. SPRUDE
BY
William R. Nolte
AGENT

INDUCTIVE NOISE CANCELLING DEVICE FOR MAGNETIC MEMORY ARRAY

Filed June 8, 1964 2 Sheets-Sheet 2

INVENTORS.
CHARLES B. HAENTZE
EDGAR O. SPRUDE
BY
William R. Nolte
AGENT

United States Patent Office 3,389,385
Patented June 18, 1968

3,389,385

INDUCTIVE NOISE CANCELLING DEVICE FOR MAGNETIC MEMORY ARRAY

Charles B. Haentze, Broomall, and Edgar O. Sprude, Philadelphia, Pa., assignors to Burroughs Corporation, Detroit, Mich., a corporation of Michigan Filed June 8, 1964, Ser. No. 373,309
14 Claims. (Cl. 340—174)

This invention relates to noise cancelling devices and more particularly, to such devices capable of reducing noise in thin film memory arrays. The present invention may be used in conjunction with and constitutes an improvement over the invention described in a copending application entitled, "Magnetic Memory System," by Albert M. Bates, Ser. No. 226,895, filed Sept. 28, 1962, now Patent No. 3,271,741, and assigned to the same assignee as the present invention.

In the magnetic memory system described in the above-referred to copending application, thin film memories are packaged in very compact assemblies. The storage bits or elements of the memory may be films deposited on a substrate which is sandwiched between printed circuit board means having word, sense and information conductors printed thereon. In this construction the word conductors pass over a memory element in one direction while the information and sense conductors pass across each bit in a direction normal to that of the word conductor. The high density in-place fabrication of the elements of the memory, and the correspondingly close spacing of the sense and information windings one to another, along with other factors, have posed problems of uniformity which require that undesired noise signals generated be reduced on individual conductors to achieve a usable signal-to-noise ratio.

One of the objects therefore of this invention is to provide an improved memory system.

Another object of this invention is to provide in a memory system means for controlling the coupling of noise from one conductor to another.

A still further object of this invention is to provide means for manually adjusting the electromagnetic coupling between associated conductors.

In accordance with the invention, the memory plane array comprises substrate means having a plurality of magnetic memory elements, deposited thereon and which is sandwiched between printed circuit plate means. The latter may include a plurality of word, and associated sense and information conductors which loop around the substrate so that each conductor acts similarly to a single turn solenoid. The word conductors cross over each memory element in one direction and the associated information and sense lines pass across each memory element in a direction normal thereto. The memory array further includes manually adjustable means to vary the electromagnetic coupling between associated sense and information windings to achieve a usable signal-to-noise ratio therebetween.

For a better understanding of the present invention, together with other and further objects thereof, both as to the organization and method of operation, reference is had to the following description taken in connection with the accompanying drawings and its scope will be pointed out in the appended claims.

Figure 1:
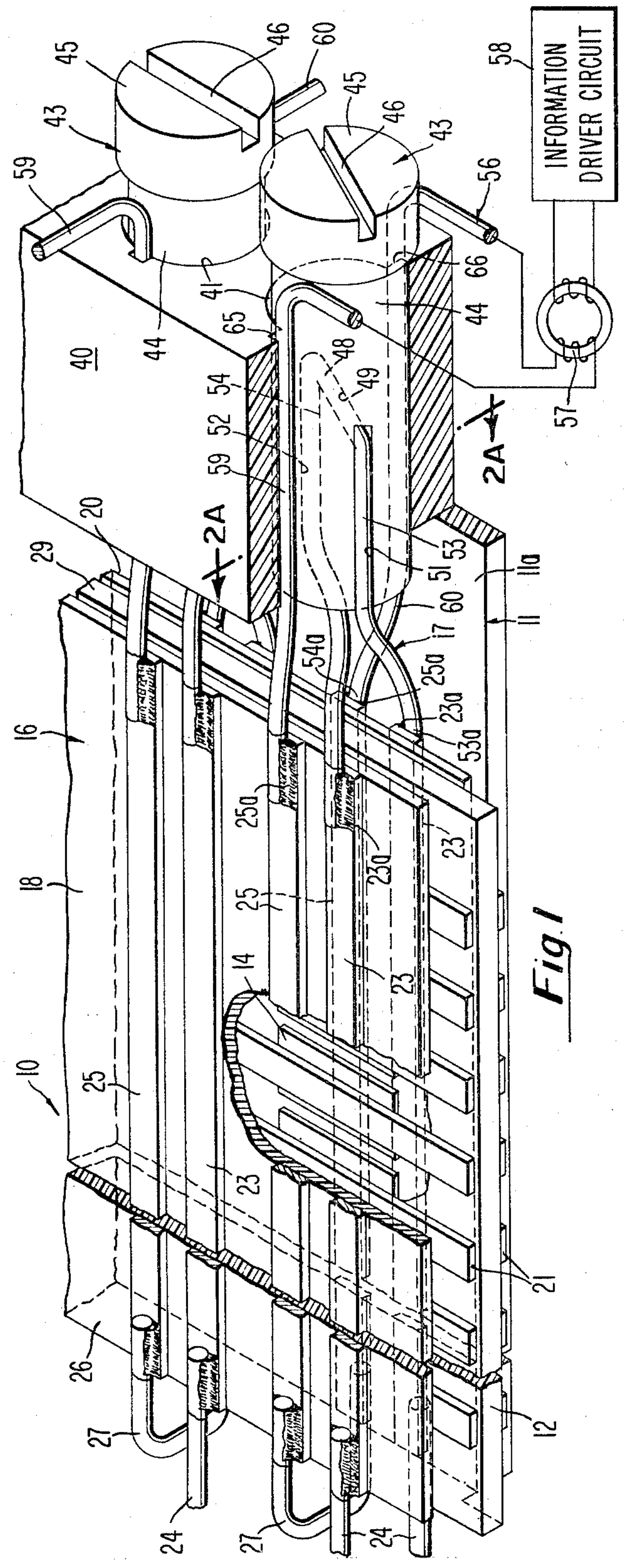
FIGURE 1 is a pictorial view, partially in section of a portion of a memory plane array embodying the present invention.

Referring to FIGURE 1 of the drawing there is shown a portion of a magnetic memory array 10 of the configuration shown and described in the above referred to application of Albert M. Bates, entitled, "Magnetic Memory System," Ser. No. 226,895, which embodies the invention, supported upon a suitable frame or base 11. The memory array comprises an inner layer or substrate member 12 which may be of glass or other material and having a plurality of magnetic memory elements 14 deposited thereon. The memory bits or elements may be of any magnetic square-loop material. In the present instance, each bit constitutes a thin film of nickel-iron having a thickness of approximately 200 angstroms, which may be deposited on the substrate by vacuum deposition while under the influence of a magnetic field. To achieve a high density array the memory elements are disposed in closely spaced relationship in rows and columns on one surface of the substrate with printed circuit means 16 overlying the same. In the present form of the invention the printed circuit means 16 is shown as consisting of top and bottom printed circuit boards 18 and 20 sandwiching the substrate 12. The top printed circuit board 18 includes word conductors 21 disposed on its inner lower surface and alternately disposed sense and information windings 23, 25 respectively on its outer surface and passing each bit in a direction at right angles to the word lines. This arrangement permits printing of the word, information and sense lines on one double clad printed circuit board. The printed circuit board 20 disposed opposite the lower face of the substrate 12 is likewise of similar construction.

The principles of the noise cancelling features of the memory array may be best explained with reference to a single memory element 14 which is in the form of a rectangle of greater width than length. The columnar word drive conductor 21 associated with each memory element illustrated passes across the same along its long dimension, while a sense and an information conductor 23, 25, constituting a pair, cross each bit in a rowwise direction transverse to the word conductor. The sense conductors 23 include connections 24 which project outwardly top and bottom from edge 26 of the array for connection with suitable sense amplifying circuitry and which forms no part of the present invention. Like spaced information conductors 25 on the top and bottom printed circuit boards 18, 20 are connected by U-shaped end around conductors or jumpers 27 adjacent the edge 26 of the array to thereby form a single conductor therewith in the form of a single turn solenoid. Due to the close side by side relationship of the sense conductor with its associated information conductor forming each sense-information pair thereof, noise signals are mutually induced when current flows in one or the other of the windings. Thus by way of example, when an information current pulse is caused to flow in the information winding 25, a noise signal is developed on the sense line 23. This signal results from its inductive coupling to the sense conductor and it has been found desirable to minimize the same.

In order to so reduce the electromagnetic coupling of noise from one conductor of the sense-information pair to the other conductor thereof the following arrangement is provided. Frame 11 which supports the memory array 10 on its top surface 11*a* includes an enlarged end portion 40 which projects in spaced parallel relationship with the edge 29 of the substrate. A plurality of elongated holes or bores 41, the axes of which are disposed normal to the edge 29 of the memory are provided in the enlarged end portion to receive a plurality of tuning elements 43 therein. Each tuning element is shown to be of generally cylindrical form having an elongated body portion 44 of lesser diameter than bore 41, and an enlarged head portion 45 of greater diameter than the bore. Each head portion includes a depression 46 to permit turning of the same as by a screwdriver. An electrically conductive loop member 47 of U-shaped configuration is threaded through each tuning element having its base portion 48 received in transverse hole 49 therein. Grooves 51 and 52, see FIG. 2A, diametrically disposed within the outer surface of the member and parallel with its major axis are provided to receive therein arms 53, 54 respectively of the U-shaped member. The free ends 53*a*, 54*a* of the arms 53, 54 respectively are electrically connected as by solder connections 23*a*, 23*b*, to top and bottom ends of sense conductors 23 which terminate at adjacent edge 29.

Each corresponding information conductor 25 of the pair of rowwise conductors common to any given memory element of the array is shown as including an electrically conductive transformer loop 56 connected to a transformer coil 57 which in turn is associated with information driver circuitry 58. The loop 56 includes segments 59, 60 which likewise extend outwardly from the aforementioned edge 29 of the array for side by side disposition relative to the arms 53, 54 of the loop element 47 and are electrically connected in a similar manner to the ends of the bit conductors 25 adjacent edge 29 by solder connections 25*a*, 25*b*. The segments 59, 60 pass through bore 41 and are received in diametrically disposed top and bottom grooves 65, 66 respectively in the wall surfaces defining the bore. Each groove 65, 66 is wide enough to accept the full diameter of the wire forming the loop but its depth is only one-half the diameter of the wire, FIGURE 2. One-half of each segment thus extends in the annular space between the bore 41 and the outer surface of the elongated cylindrical portion 44 of member 45. The grooves 51 and 52 which receive arms 53, 54 of U-shaped member 47 are of similar dimension so that one-half of each arm thereof rides in the aforementioned annular space. With this construction as seen in FIGURE 2A, the arms 53, 54 of member 47 are positively aligned with corresponding segments 59, 60 of loop 56 and thereby eliminating the need for adhesives or other fastening means.

Figure 2C:
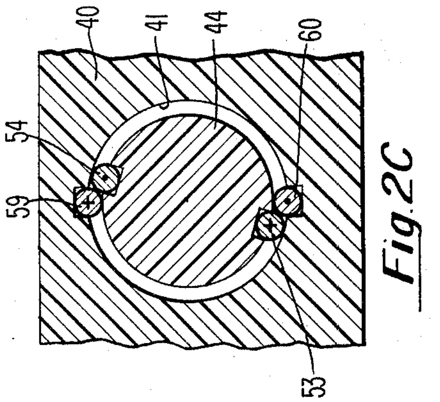
FIGURES 2A, 2B and 2C are sectional views taken along the line 2—2 of FIGURE 1 but showing the noise cancelling elements rotated to various positions including opposed extreme limiting positions thereof.
Figure 2B:
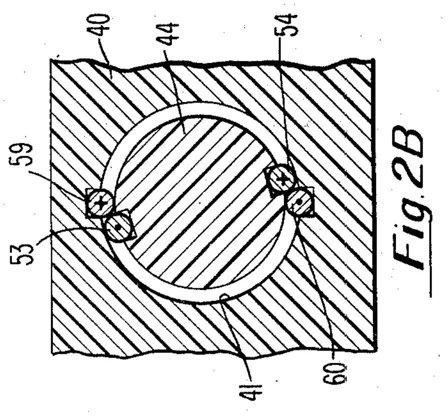
Figure 2A:
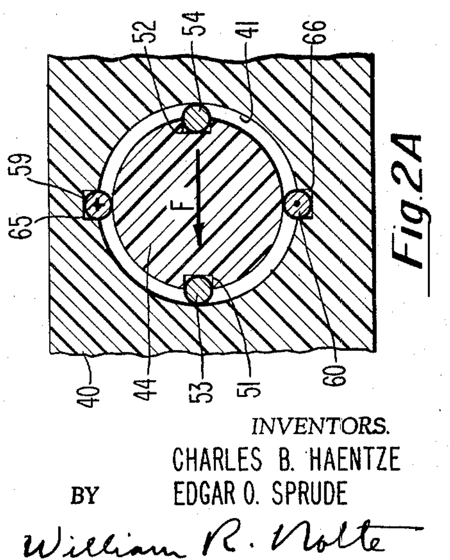

When the information driver circuitry 58, previously referred to, is suitably activated as set out in greater detail in the above-referred to copending application to Bates, S.N. 226,895, filed Sept. 28, 1962, a current pulse is caused to flow through segment 59, top conductor 25, jumper 27, lower conductor 25 and thence through segment 60 which thereby generates a magnetic field indicated schematically in FIG. 2A, by arrow F. As seen in FIGURE 2A, the tuning rod 43 is oriented so that the arms 53, 54 of sense loop conductor 47 are contained in a plane which is parallel to the direction of the magnetic field indicated by arrow F. Thus when the information current is turned on or off the changing flux from the segments 59, 60 will not cut the arms 53, 54 or the base 48 of the sense loop 47 and consequently will not induce a current in the sense loop 47 of the sense winding.

When the tuning rod 43 is turned clockwise, FIG. 2B, through an angle of slightly less than 90° from the position shown in FIG. 2A, a maximum out-of-phase current flow is induced in sense loop 47 of the sense winding by flowing therearound through arm 53, base 48 and arm 54. The actual maximum displacement angle of the tuning rod from the neutral position shown in FIG. 2A is determined by the diameters of wires used and the diameter of the tuning rod itself. This is illustrated schematically by the (+) and (·) symbols, the former of which indicates current flow in the conductor in a direction into the plane of the paper and the latter indicates emergence of the current out of the plane of the paper. When however, the tuning element is turned, for example, as shown in FIG. 2C, to its position of maximum counterclockwise orientation, and with the current turned on and off in segments 59, 60 and in the same direction as indicated in FIG. 2A, the current induced in the sense loop is caused to flow in a direction through arm 54, base 48 and thence through arm 53 to constitute a maximum in-phase or additive coupling in the sense winding of the pair. It is noted that current flow in arm 54 in FIG. 2C is opposite to that shown in FIG. 2B and likewise the direction of current flow in arm 53, FIG. 2C, is opposite to that indicated in FIG. 2B for the segment.

The portion of segment 59 and 60 of the information lines 25 which project from their respective grooves into the annular space 41 prevents further rotation of the tuning rod 43 when encountering the portions of the wires constituting arms 53, 54 of loop 47 which also project from their respective grooves into the same annular space. By providing insulated wire for either sense loop 47 or information winding 56, or both, short circuits are avoided. It will be noted that the length of the arms 53, 54 of the sense loop 47 determines the maximum value of in-phase or out-of-phase voltage induced in said loop. The need for rotating the tuning rod 43 therefore to either extreme position can be eliminated by selection of the proper length of the arm 53, 54 to produce a maximum value of cancelling voltage in excess of that required for a given application.

While the tuning elements 43 above have been illustrated as being of non-magnetic material, it should be evident that in certain applications the tuning effect could be greatly increased by utilizing a material characterized by high maximum permeability and high initial permeability. It should in addition be evident that a similar tuning arrangement as illustrated adjacent edge 29 of the printed circuit board could be applied adjacent its opposite edge 26 thereof, either instead of, or in addition to the above-described arrangement.

Figure 3:
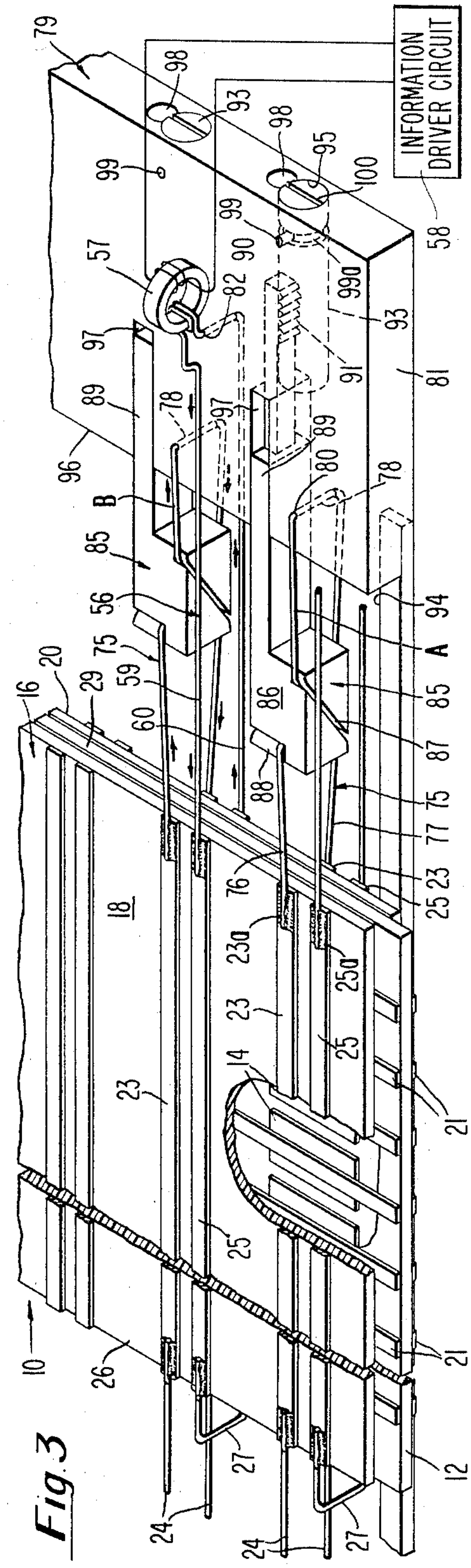
FIGURE 3 is a pictorial view partially in section showing a portion of a memory plane array and illustrating a modified form of the invention.

A modification of the noise cancelling apparatus of FIGURE 1 and embodying this invention is shown in FIGURE 3. The modified form of the noise cancelling apparatus is similar to that shown in FIGURE 1 and corresponding parts of the novel memory array including the substrate with the memory elements thereon, the sandwiching printed circuit boards, and the supporting frame thereof are indicated with identical reference numerals. For clarity of illustration however, the locations of sense conductor paths 23 and information conductor paths 25 in FIGURE 3 are transposed one to another with respect to their positions shown in FIGURE 1. Like spaced top and bottom sense conductor paths 23 are connected adjacent edge 29 of the memory array by means of a closed conductor loop 75 having crossover lengths 76, 77 connected to the terminal ends of top and bottom sense conductor paths 23, as at 23*a* and 23*b* respectively. The base portion 78 of the loop is anchored in rectangular frame 79 by passing through aperture 80 in end rail 81 thereof. At the opposite end 26 of the array the top and bottom conductor paths 23 are connected by straight wires 24 to thus constitute a single turn solenoid encircling a row of memory elements 14 on the board. The spaced top and bottom information conductors 25 are connected by end around wire 27, adjacent edge 26 of the array and at the opposite edge 29 are connected by information loop 56.

The segments 59, 60 of associated information loop 56 extend in parallel relationship to the general plane containing lengths 76, 77 and segment 60 thereof is shown passing beneath the lower surface of end rail 81 to enter aperture 82 and to thereafter encircle transformer core 57 which in turn is associated with information driver circuitry 58 referred to above. The top segment 59 then returns from the core 57 to information path 25.

Figure 5:
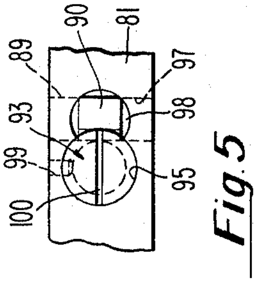
FIGURE 5 is a partial end view of the frame containing a tuning pinion.

In order to vary the electromagnetic coupling between the sense loop 75 and the information loop 56 of each sense information pair of conductors, an adjustable member 85 is provided to cooperate with the crossover lengths 76, 77 of the sense loop to fix the location at which the lengths intercept. For this purpose the adjustable member 85 includes a cross-head 86 containing oppositely disposed slots 87, 88 on opposite sides thereof, and a shank 89 of rectangular cross-section contiguous with one end of the head. The extremity of the shank is stepped down in cross-section to constitute a bar portion 90 with a number of teeth 91 along an edge thereof which engage suitable fast type threads 92 of pinion rod 93. The rectangular frame 79 is shown as forming a central cutout portion 94 to receive the memory array 10 therein, and the previously referred to end rail 81 is shown as including a plurality of bores 95 which serve to journal the pinion rods 93 of adjacent sense-information pairs for rotation therein about their respective axes. In order to prevent twisting of cross-head 85 as a result of such rotation, the inside edge 96 of end rail 81 includes a plurality of rectangular notches 97 for mating engagement with the rectangular shank portions 89 of the cross-heads. An additional bore 98, of smaller diameter than bore 95, see FIG. 5, is provided in the rail and is contiguous with the latter bore to permit movement of the toothed bar portion 90 of shank 89. The outer end of the pinion rod is under-cut as at 99*a* to receive the lower end of screw 99 threaded into the top side of the end rail and is thereby effective to restrain the pinion rod against movement along its axis. The outer end face of the turning rod includes a slot 100 to permit turning of the rod in either direction about its axis.

Figure 4:
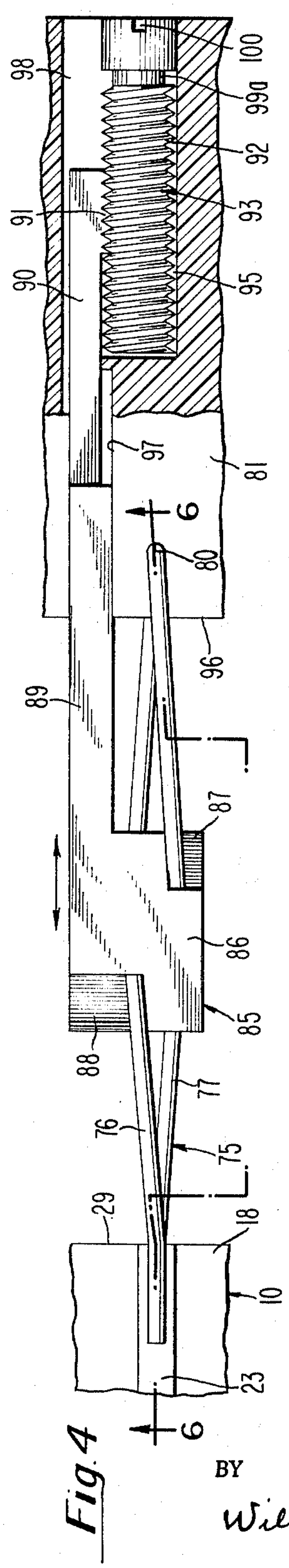
FIGURE 4 is an enlarged plan view illustrating one position of the loop adjusting means.
Figure 6:
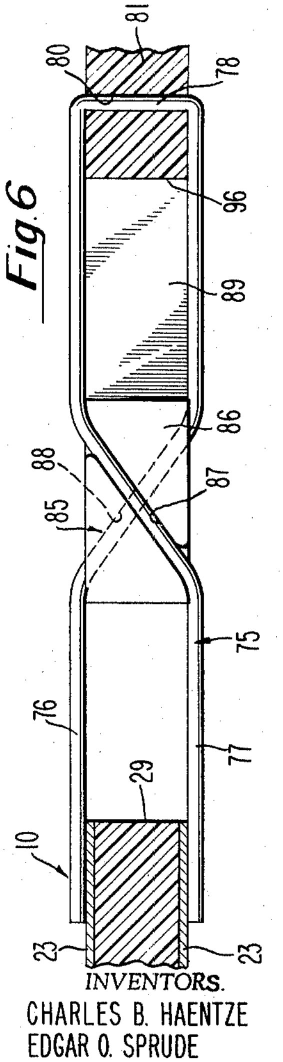
FIGURE 6 is a sectional view taken along the line 6—6 of FIGURE 4 and illustrating the sense loop in elevation.

Referring to FIGS. 4 and 6, it is seen that cross-over segment 76 of loop 75 extends rightwardly away from edge 29 at the top of the memory array, to the top surface of cross-head 86 to enter notch 88 and downwardly through the notch to the right to emerge from the lower surface of the head, and thence rightwardly to aperture 80 where it connects to the base portion 78 in the end rail 81. Cross-over segment 77, commencing at the lower surface of the memory array and adjacent edge 29 thereof, extends rightwardly and adjacent the lower surface of cross-head 85 to enter slot 87 on the near side of the head, upwardly to the top upper right-hand portion of the head, and thence rightwardly to conect to the base portion 78.The slots 87, 88 do not meet within the head so that the material between the slots is effective to constitute a barrier which prevents the segments 76, 77 from rubbing together when the cross-head is for example, moved between its various positions. The edges defining each of the slots 88, 89 may be suitably faired or curved to reduce the resistance to movement of the cross-head.

With respect to FIGURE 3, two cross-heads 85 are illustrated and the lower cross-head member 85 has been advanced to the left a greater amount than the upper cross-head in the illustration, so that the size of the loop indicated at A formed by the lower member is greater than the loop B formed by the upper members. Thus, when current is caused to flow in the information segments 59, 60 as indicated by the direction of the small arrows adjacent the segments, the current induced in loop 75 is in an opposite direction and is counter-active as indicated by the arrows adjacent the loop. The residual noise induced in the loop conductor 75 can thus be reduced to a minimum by moving the cross-over point, which changes the size of the closed loop.

Although the above-described embodiments disclose the invention as applied to a thin-film memory array, it is to be understood that the invention may be applied to other types of memory circuitry, and it will be obvious to those skilled in the art that various changes and modifications may be made therein without departing from the invention and it is therefore aimed in the appended claims to cover all such changes and modifications as fall within the true spirit and scope of the invention.

What is claimed is:

1. In a memory plane, first and second windings each looped around opposite planar surfaces thereof said first winding having ends thereof terminating adjacent one edge portion of said memory plane and said second winding having end portions extending beyond said edge portion thereof, a frame adjacent said edge and having a plurality of apertures disposed therein, a member of electrically non-conductive material mounted for rotational movement in each aperture, and a conductive element threaded through said member and having its ends electrically connected to the ends of said first winding to form a loop therewith, whereby rotational movement of said member varies the electromagnetic coupling of said loop with the second winding.

2. In a memory plane, first and second windings each looped around opposite surfaces thereof, said first winding having ends terminating adjacent one edge of said memory plane and said second winding having end portions extending beyond said edge, a frame secured in spaced relation adjacent said edge and having a plurality of apertures disposed therein, a cylindrical member of electrically non-conductive material mounted for rotational movement in each aperture, a conductive element threaded through each said cylindrical member and having its ends electrically connected to the ends of said first winding to form a loop therewith, said member having grooves in its outer surface generally parallel to the axis of said member for receiving portions of said conductive element, the wall surfaces defining said apertures including like grooves therein for receiving the end portions of said second winding, whereby rotational movement of said member causes said loop to be rotated to thereby couple to the second winding a voltage which is different from the voltage coupled to that winding when said element is in its first position.

3. In a memory plane, first and second windings looped around opposite faces thereof, said first winding having ends thereof terminating adjacent one edge of said memory plane and said second winding having segments extending beyond and normal to said edge thereof, a frame having a plurality of elongated apertures disposed in a direction normal to said edge, a rod of dielectric material mounted for rotational movement in each aperture, and a U-shaped conductive element having its base portion extending through a transverse aperture in the rod and having the ends of its arm portions secured to the ends of the first winding terminating adjacent one edge of the plane, each said elongated aperture including a pair of grooves in the wall surfaces thereof and parallel to the axis of said apertures for receiving said segments whereby rotation of said rod is effective to rotate said U-shaped conductive element to thereby vary the voltage coupled to the second winding.

4. In a memory plane array, first and second windings having portions thereof disposed adjacent opposite surfaces of said array and having ends terminating adjacent one edge thereof, a conductive element in the form of a loop secured to said terminating ends of said first windings, circuit means including straight conductive segments secured to the terminating ends of the second winding to enable passage of current therethrough, and means engaging said conductive element for changing its configuration relative to said segments to thereby alter the voltage which is induced between said segments and said loop.

5. In a memory plane array, first and second adjacent parallel disposed windings each looped around opposite surfaces of said array, each said first winding having ends thereof terminating adjacent one edge portion of said array, a plurality of conductive loop elements each having its free end portions secured to the ends of a first winding which is on opposite sides of said array, said second windings having conductive segments extending beyond said one edge of said array and in side by side relation with said conductive loop elements, and control means engaging each said conductive element to move the same parallel to end portions of said second winding to thereby vary the coupling of voltage of opposite polarity between the segments and the conductive loop elements.

6. In a memory plane array, a substrate having a plurality of magnetic memory elements thereon, a plurality of first and second associated conductors looped around opposite surfaces of said substrate to cross over magnetic memory elements thereon, said first conductors having ends terminating adjacent one edge portion of said array, a plurality of conductive elements each defining a closed loop and having end portions thereof electrically connected to the terminating ends of a first conductor, said second conductors having end portions extending beyond said one edge of said array beside said loop elements, and movable means engaging each said element to vary the size of its closed loop to thereby vary the coupling of voltage of opposite polarity in the end portions of a second winding extending beyond said one edge of said array.

7. In a memory plane array, a substrate having a plurality of magnetic memory elements thereon, a plurality of first and second associated conductors disposed adjacent opposite surfaces of said substrate to cross over magnetic memory elements thereon, said first conductors having ends terminating adjacent one edge portion of said array, a plurality of conductive elements each defining a closed loop and having end portions thereof electrically connected to the terminating ends of a first conductor, said second conductors having end portions extending beyond said one edge of said array beside said loop elements, frame means for supporting said memory plane array, said frame means including guide means disposed adjacent said one edge portion of said array, and a plurality of movable means each having a transverse opening for engagement with a conductive element and mounted for movement along a line normal to said one edge of said array, whereby movement of each said movable means is effective to vary the size of the closed loop of the conductive element engaged thereby and to alter the coupling of voltage induced therein.

8. In a composite memory plane, a planar substrate member having a plurality of magnetic memory elements deposited thereon, printed circuit means disposed adjacent opposite surfaces of said planar substrate and including first windings overlying each said element in one direction with associated second and third windings lying over each element in a direction normal to the direction of said first winding, each said second winding including a loop portion and each said third winding associated therewith including end portions extending normally beyond one edge of said substrate member, and means engaging each said loop portion of a second winding for rotating the same relative to the end portions of its associated third winding to vary the inductive coupling between the end portions of said third winding and said loop portion.

9. In a composite memory plane having a supporting frame, a planar substrate member having a plurality of memory elements of magnetic square loop material deposited in discrete areas thereon, printed circuit board means sandwiching said planar member, and including a first winding crossing said memory elements in one direction and second and third associated windings crossing elements in a direction normal to said first winding, said second windings including ends on opposite sides of and terminating adjacent one edge of said substrate member, said third winding including ends terminating adjacent said one edge of said substrate member and including segments extending beyond said one edge thereof, a plurality of rods mounted in said supporting frame and disposed adjacent the ends of said second windings, and a loop of conductive material threaded through each said rod and having its free end portions electrically connected to the ends of said second windings.

10. In a composite memory plane having a supporting frame, a planar substrate member having a plurality of magnetic memory elements deposited thereon, printed circuit means disposed adjacent opposite surfaces of said planar substrate and including a first winding lying over each said element in one direction and associated second and third windings lying over each element in a direction normal to the direction of said first winding, each said second winding including a loop portion and its associated third winding including end portions extending beyond and normal to one edge of said substrate member, and a plurality of rod members received in said supporting frame with each engaging a loop portion of a second winding and mounted for individual rotation relative to the end portion of its associated third winding.

11. In a composite memory plane, a planar substrate member having a plurality of magnetic film deposits on one surface thereof, each said deposit constituting a memory storage element, printed circuit means disposed in sandwiching relation to said substrate and having first windings overlying said elements in one direction and second and third windings which overlie said elements in a direction normal to the direction of said first windings, said second windings having ends thereof terminating adjacent one edge portion of said plane and said third windings including segments extending beyond said edge portions thereof, a plurality of loops of conductive material each electrically connected to the terminating ends of a second said winding and disposed beside said segments and movable means engaging a portion of each said loop, whereby movement of said movable means changes the inductive coupling between the loop and said segments.

12. In a planar memory array, first and second windings each having portions thereof disposed adjacent opposite surfaces of said planar array and including ends terminating adjacent one edge thereof, a conductive loop element having arm portions intersecting one another and secured to the terminating ends of said first winding, said second winding having conductive segments connected to its terminating ends and disposed beside said conductive loop element, means engaging said intersecting arm portions of said conductive loop elements, and means for moving said intersecting arm engaging means to change the location at which said arms intersect one another.

13. In a planar memory array, first and second windings each having portions thereof disposed adjacent opposite surfaces of the planar array and including ends terminating adjacent one edge thereof, a conductive loop element having arm portions disposed in intersecting relationship to one another and secured to the terminating ends of said first winding, said second winding having conductive segments connected to its terminating ends and disposed beside said conductive loop element, slotted means engaging said intersecting arm portions of said conductive loop element, said slotted means including a bar with teeth along its length, and pinion means for engaging the teeth of said bar, whereby rotation of said pinion means imparts linear movement to said bar and slotted means to vary the locations of the intersection of the arm portions of the conductive loop.

14. In a planar memory array, first and second windings each having portions thereof disposed adjacent opposite surfaces of the planar array and including ends terminating adjacent one edge thereof, a frame disposed adjacent one edge and having a notch therein, a conductive loop element having arm portions disposed in intersecting relationship to one another and secured to the terminating ends of said first winding, said second winding having conductive segments connected to its terminating ends and disposed beside said conductive loop element, slotted means engaging said intersecting arm portions of said conductive loop element, shank means contiguous with said slotted means and movable within the notch in said frame, and means for moving said shank means to vary the location of the intersection of the arm portions of the conductive loop.

References Cited

UNITED STATES PATENTS

| | | | |
|---|---|---|---|
| 2,900,624 | 8/1959 | Williams et al. | 340—174 |
| 3,000,004 | 9/1961 | Weller | 340—174 |
| 3,142,049 | 7/1964 | Crawford | 340—174 |
| 3,181,131 | 4/1965 | Pryor et al. | 340—174 |
| 3,181,132 | 4/1965 | Amemiya | 340—174 |
| 3,298,005 | 1/1967 | Matick | 340—174 |
| 3,325,793 | 6/1967 | Simkins et al. | 340—174 |

STANLEY M. URYNOWICZ, Jr., *Primary Examinuer.*